United States Patent
Wong et al.

(10) Patent No.: US 7,873,660 B1
(45) Date of Patent: Jan. 18, 2011

(54) ENFORCING DATA PRIVACY AGGREGATIONS

(75) Inventors: Daniel Manhung Wong, Sacramento, CA (US); Chon Hei Lei, Alameda, CA (US); Rama Vissapragada, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 899 days.

(21) Appl. No.: 10/377,366

(22) Filed: Feb. 27, 2003

(51) Int. Cl.
*G06F 7/00* (2006.01)
*G06F 17/30* (2006.01)

(52) U.S. Cl. ........................ 707/781; 707/705
(58) Field of Classification Search .................. 707/1, 707/2, 3, 10, 200, 781, 999.05
See application file for complete search history.

(56) References Cited

U.S. PATENT DOCUMENTS

| | | | |
|---|---|---|---|
| 5,133,075 A | 7/1992 | Risch | |
| 5,241,305 A | 8/1993 | Fascenda et al. | |
| 5,265,221 A | 11/1993 | Miller | |
| 5,276,901 A | 1/1994 | Howell et al. | |
| 5,335,346 A | 8/1994 | Fabbio | |
| 5,428,778 A | 6/1995 | Brookes | |
| 5,499,368 A | 3/1996 | Tate et al. | |
| 5,748,899 A | 5/1998 | Aldrich | |
| 5,751,949 A | 5/1998 | Thomson et al. | |
| 5,765,154 A | 6/1998 | Horikiri et al. | |
| 5,787,428 A | 7/1998 | Hart | |
| 5,815,574 A | 9/1998 | Fortinsky | |
| 5,832,226 A | 11/1998 | Suzuki et al. | |
| 5,848,408 A * | 12/1998 | Jakobsson et al. | 707/3 |
| 5,864,842 A | 1/1999 | Pederson et al. | |
| 5,940,818 A | 8/1999 | Malloy et al. | |
| 5,963,932 A * | 10/1999 | Jakobsson et al. | 707/2 |
| 6,026,388 A | 2/2000 | Liddy et al. | |
| 6,098,081 A | 8/2000 | Heidorn | |
| 6,134,549 A | 10/2000 | Regnier et al. | |
| 6,253,203 B1 | 6/2001 | O'Flaherty et al. | 707/9 |

(Continued)

FOREIGN PATENT DOCUMENTS

EP 1 089 194 A2 4/2001

(Continued)

OTHER PUBLICATIONS

Michael Stonebraker et al., "Access Control in a Relational Data Base Management System by Query Modification," ACM/CSC-ER, 1974, XP-002319462, pp. 180-186.

(Continued)

*Primary Examiner*—Cam Y Truong
*Assistant Examiner*—Michael Pham
(74) *Attorney, Agent, or Firm*—Hickman Palermo Truong & Becker LLP

(57) ABSTRACT

Described herein is an approach that may be used to control access to information requested by a query, where access is granted or denied to all the information requested based on factors that relate to information requested as a whole rather than on individual-by-individual row basis. Also described is a mechanism in which a database server dynamically creates and computes another query in response to receiving a query, and then uses the computed results to determine whether access to the data requested by the received query may be granted.

14 Claims, 3 Drawing Sheets

U.S. PATENT DOCUMENTS

| | | | |
|---|---|---|---|
| 6,275,824 | B1 | 8/2001 | O'Flaherty et al. |
| 6,275,825 | B1 * | 8/2001 | Kobayashi et al. ............... 1/1 |
| 6,308,273 | B1 | 10/2001 | Goertzel et al. |
| 6,363,387 | B1 | 3/2002 | Ponnekanti et al. |
| 6,366,904 | B1 | 4/2002 | BenHadda et al. |
| 6,449,609 | B1 | 9/2002 | Witkowski |
| 6,487,522 | B1 * | 11/2002 | Smith et al. ............... 702/186 |
| 6,487,552 | B1 | 11/2002 | Lei et al. |
| 6,493,722 | B1 | 12/2002 | Daleen et al. |
| 6,539,398 | B1 | 3/2003 | Hannan et al. |
| 6,578,037 | B1 * | 6/2003 | Wong et al. ............... 707/10 |
| 6,587,854 | B1 | 7/2003 | Guthrie et al. ............... 707/9 |
| 6,609,121 | B1 | 8/2003 | Ambrosini et al. |
| 6,618,721 | B1 * | 9/2003 | Lee ............... 707/3 |
| 6,631,371 | B1 * | 10/2003 | Lei et al. ............... 707/4 |
| 6,678,822 | B1 | 1/2004 | Morar et al. |
| 6,684,227 | B2 | 1/2004 | Duxbury |
| 6,757,670 | B1 | 6/2004 | Inohara et al. |
| 6,763,344 | B1 * | 7/2004 | Osentoski et al. ............... 707/1 |
| 6,847,998 | B1 | 1/2005 | Arcieri et al. |
| 6,873,982 | B1 * | 3/2005 | Bates et al. ............... 1/1 |
| 6,920,457 | B2 | 7/2005 | Pressmar |
| 6,976,017 | B1 * | 12/2005 | Getchius ............... 1/1 |
| 6,986,060 | B1 * | 1/2006 | Wong ............... 707/9 |
| 6,996,557 | B1 | 2/2006 | Leung et al. |
| 7,117,197 | B1 * | 10/2006 | Wong et al. ............... 707/3 |
| 7,158,966 | B2 | 1/2007 | Brill et al. |
| 2001/0021929 | A1 | 9/2001 | Lin et al. |
| 2002/0095405 | A1 * | 7/2002 | Fujiwara ............... 707/3 |
| 2003/0014394 | A1 * | 1/2003 | Fujiwara et al. ............... 707/3 |
| 2003/0236781 | A1 | 12/2003 | Lei et al. |
| 2003/0236782 | A1 | 12/2003 | Wong et al. |
| 2004/0064466 | A1 | 4/2004 | Manikutty et al. |
| 2004/0139043 | A1 * | 7/2004 | Lei et al. ............... 707/1 |
| 2004/0254948 | A1 | 12/2004 | Yao |
| 2005/0050046 | A1 | 3/2005 | Puz et al. |
| 2005/0177570 | A1 | 8/2005 | Dutta et al. |

FOREIGN PATENT DOCUMENTS

| | | |
|---|---|---|
| JP | 2002/312220 | 10/2002 |

OTHER PUBLICATIONS

T.F. Keefe et al., "Secure Query-Processing Strategies," IEEE, No. 3, Mar. 1989, XP 000122365, pp. 63-70.

International Search Authority, "Notification of Transmittal of the International Search Report and the Written Opinion of the International Searching Authority, or the Declaration," International Application No. PCT/US2004/043480, Apr. 22, 2005, 12 pages.

Current Claims Of International Application No. PCT/US2004/043480, pp. 1-6.

International Preliminary Examining Authority, "Written Opinion", PCT/US2003/041541, mailing date Sep. 1, 2005, 6 pages.

Current Claims, PCT/US2003/041,541, 3 pages.

Motro, Amihai, "An Access Authorization Model for Relational Databases Based on Algebraic Manipulation of View Definitions," Data Engineering, 1989, XP010015183.

* cited by examiner

ENFORCING DATA PRIVACY AGGREGATIONS

RELATED APPLICATION

This application is related to U.S. application Ser. No. 09/167,092, filed Oct. 5, 1998, entitled "Database Fine-Grained Access Control", herein referred to as Lei, and naming as inventors Chon Hei Lei and Douglas James McMahon, the entire disclosure of which is hereby incorporated herein by reference.

This is related to U.S. application Ser. No. 09/589,602, filed Jun. 7, 2000, entitled "Partitioned Access Control To A Database", herein referred to as Wong, and naming as inventors Daniel ManHung Wong, Chon Hei Lei, the entire disclosure of which is hereby incorporated herein by reference.

FIELD OF THE INVENTION

The present invention relates to controlling access to information, and in particular, to controlling access to data stored or managed by a database server.

BACKGROUND OF THE INVENTION

A database server stores data in one or more data containers, each container contains records, and the data within each record is organized into one or more fields. In a database system that stores data in a relational database, the data containers are referred to as tables, the records are referred to as rows, and the attributes are referred to as columns. In object oriented databases, the data containers are referred to as object classes, the records are referred to as objects, and the attributes are referred to as object attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A row in a table maintained by a database server may contain confidential information about individuals. Access to such rows needs to be controlled to protect the confidential information. In fact, many countries impose laws that restrict access to confidential information. Examples of such information include census data or medical information. However, while information in a row about a particular individual maybe confidential, aggregate information derived from many such rows may not be confidential. For example, while the individual salaries of persons living in a zip code is confidential, the average salary of persons living in the zip code is not confidential information. Aggregate information of this type is very valuable and public access to it is important.

Many countries, especially Europe, impose strong privacy requirements on confidential demographic data (e.g. census data). Publicly exposing a database that stores such data for public analysis while protecting confidentiality in order to conform with privacy laws is a very challenging task. For example, in many census bureaus around the world, there have been attempts to develop systems that permit users to run only queries that request aggregated information that do not return data that can be identified with a particular individual. Unfortunately, these specialized systems have been very expensive to develop and evolve in response to changing user needs and laws and regulations of many countries.

One approach that has been attempted to protect databases that hold confidential information while allowing public access to aggregate information is to allow users to access data by running a query that may be selected from a library of queries. No user specific query is allowed. This is the approach used by most census bureaus today. The biggest disadvantage of this approach is that too often information needed by a user cannot be retrieved or derived from one of the queries in the library.

Another alternative approach is to pre-build summary data (e.g. materialized views) that include information aggregated in all the ways needed by users. The overhead of this approach is onerous because the summary data that needs to be computed in order to meet needs of all users who access the summary data is enormous.

Another approach is to allow users to request information through a user interface which limits the type of information requested by users. The user interface allows a user to specify criteria by which to return aggregated information. For example, a user could request the average salaries of individuals that live in a particular area and that fall within a particular range. The user interface contains user controls that allows the user to specify a region and an age range. The user interface would not contain controls that allow a user to specify a particular street or address.

This approach has several disadvantages. First, it is often overly protective of confidentiality. The user interfaces do not provide the ability to specify criteria for attributes or classifications that can potentially be used to return information about specific individuals. For example, a street may have hundreds of individuals while another street may have one. The user interface does not allow a user to make a request that can specify a particular street because of the possibility that the returned information may be limited to the street with one or a few individuals.

Another disadvantage of this approach is that it limits user access to information to that which can be obtained through the user interface. Under this approach, users cannot access the database more directly, and do not have the kind access needed to use powerful database use tools.

Another disadvantage of approaches mentioned above is that they do not prevent access to confidential information in a database by users that have the ability to directly access the database without having to go through, for example, a user interface or API ("Application Programmers Interface").

Clearly, there is a need to find a mechanism that protects confidentially of data that avoids the disadvantages attendant to the approaches discussed above.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
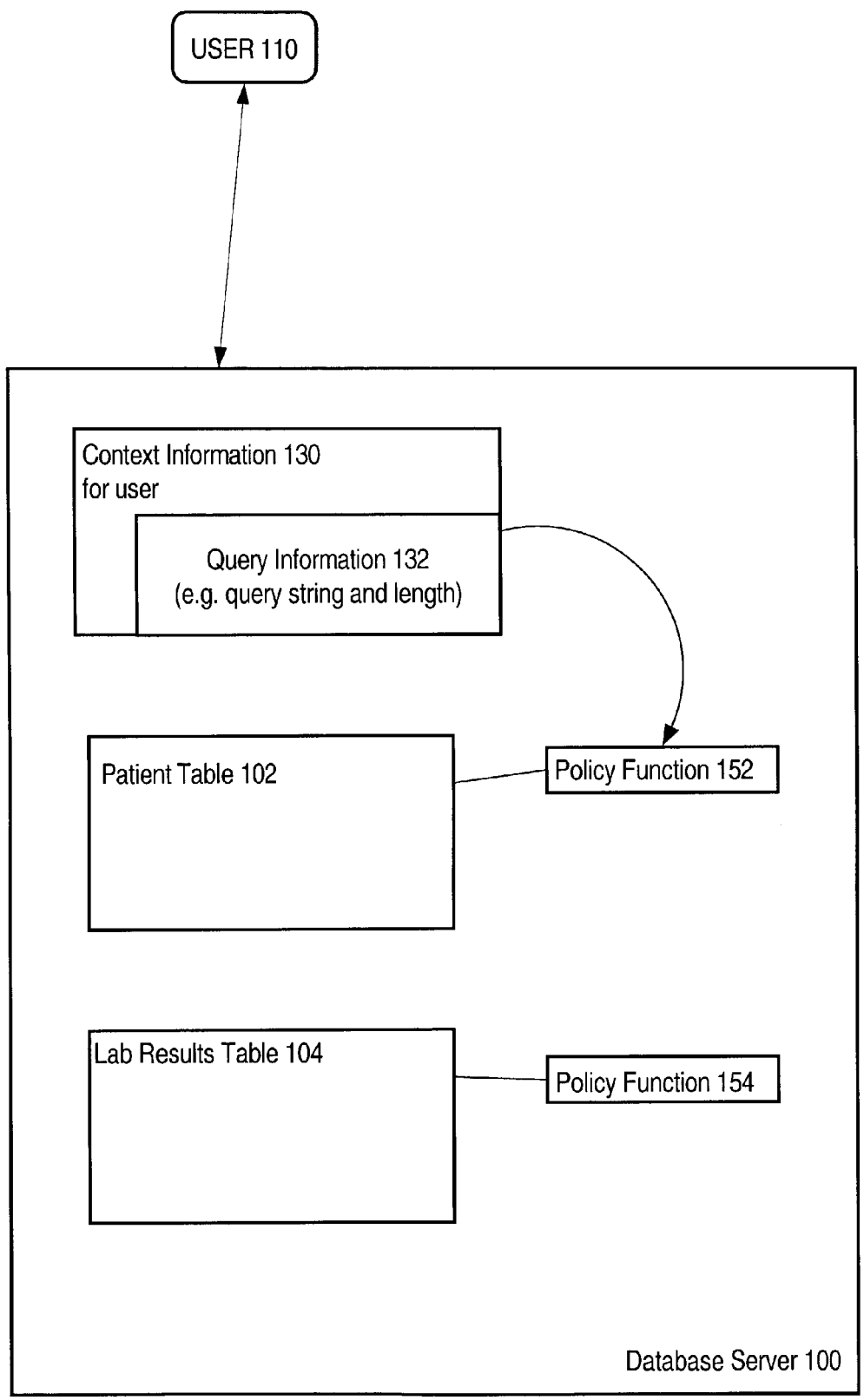
FIG. 1 is a block diagram depicting a database server with an access control mechanism which may be used to implement an embodiment of the present invention.

A method and apparatus for controlling access by queries to information is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is an approach that may be used to control access to information requested by a query, where access is granted or denied to all the information requested based on factors that relate to information requested as a whole rather than on an individual-by-individual row basis. The approach is illustrated by a mechanism that governs access to aggregate information requested by queries issued by a user. The mechanism only allows access to aggregate information only if it requires aggregating a number of rows greater than a threshold number entities for which the rows hold information. Examples of such entities include patients, individuals about which census information is collected, and even information about businesses.

Aggregated information in a database is derived by applying an aggregate function (e.g. sum, average, minimum, maximum) to the values in a column ("measure") of a subset of rows in a table. Often, tables that contain confidential data have rows that correspond to real world entities and that contain confidential information about the real world entities. For example, a patient table has rows that each correspond to a patient, a lab results table has rows that can each correspond to multiple patients. The mechanisms for controlling access to aggregate information described herein controls access to the aggregate information based on the number of such real world entities the aggregate information reflects. The number of such real world entities is referred to herein as the base cardinality.

Also described herein is a mechanism in which a database server dynamically creates and computes another query in response to receiving a query, and then uses the computed results to determine whether access to the data requested by the received query may be granted. This mechanism is illustrated by using it to determine whether the base cardinality of an aggregate query received from a user satisfies a threshold. A query dynamically generated in this way is used to generate results from which the base cardinality of the requested aggregate information may be determined.

For convenience of expression, various entities that represent sets of instructions (e.g. functions, queries) are described as performing actions, when in fact, a computer, process, database server, or other executing entity performs those actions in response to executing or interpreting the set of instructions. For example, a function may be described as determining that a condition exists or a query may be described as accessing information. These are just convenient ways of expressing that a computer, process, database server or other executing entity is determining that a condition exists in response to executing a function or is accessing data in response to executing or computing a query.

Fine Grained Access Control Mechanism

According to an embodiment, a mechanism for generating and using a dynamically generated query in this way may be implemented using the fine grain access control mechanisms described Lei and Wong. The fine grain access control mechanisms described in Lei and Wong are based on one or more policy functions associated with a database object (e.g. table or view). The policy functions are invoked, when, for example, a database server detects that a query is issued against the database object. The policy function returns a predicate that is appended to the query to generate a modified query. The predicate restricts access to data according to a policy implemented in one or more of the invoked policy functions. In addition, a policy function can also modify context information associated with a user which can affect subsequent database access control. In this way, user access is transparently restricted by transparently modifying queries issued by users to limit access to their data.

Policy functions can be implemented in a variety of ways. According to an embodiment, policy functions are implemented as stored procedures which are associated with a policy for a table or view through an administrative interface. The stored procedures are not native software of the database server, but are user supplied. A system package may be used to define an API through which policy functions may be administered. The database server is designed to interface with the policy functions through the API.

Controlling Access to Aggregate Information Using a fine grain Access Control Mechanism FIG. 1 shows a database server and components used by the fine grain control access mechanism of the database server, upon which an embodiment of the present invention may be implemented. Referring to FIG. 1, it shows database server 100 configured according to an embodiment of the present invention. Database server 100 manages access to database schema objects within database server 100. A database schema object may be, for example, a relational or object table, or a view. Among these database schema objects are patient table 102 and lab results table 104. Rows in patient table 102 each correspond to a patient and contains information about the patient, at least some of it being confidential. Lab results table 104 contains rows which contain information about lab results for patients. Multiple rows in lab results table 104 may correspond to one patient.

User 110 interacts with database server 100 by issuing queries, the results of which are computed by database server 100 and returned to user 110. A user may be one or more processes running on the same or a different computer system as a database server 100, including one or more processes executing an application or a user interface through which a user interacts to issue queries.

To control aggregate information derived from a particular table according to techniques described herein, a policy function should be associated with the table so that it is invoked for queries that require access to the table. To this end, patient table 102 and lab results table 104 are each associated with policy function 152 and 154.

Context Information about Query

In order to determine whether a database schema object may be accessed by a user through a query, the policy function needs information about the query, such as a text string representation of the query ("query string") and the length of the query string. Such information is stored in context information 130, which may be accessed by a policy function. Context information, such as user context information 130, is data maintained by database server 100 that is associated with a user's database session. A policy function may access context information through the aforementioned API for policy functions, subject to constraints imposed by database server 100 for security purposes. Context information 130 contains various attributes, including query information 132, which includes attributes holding a query string representation of the current query being processed for the user, and its length.

Access Control Process

Figure 2:
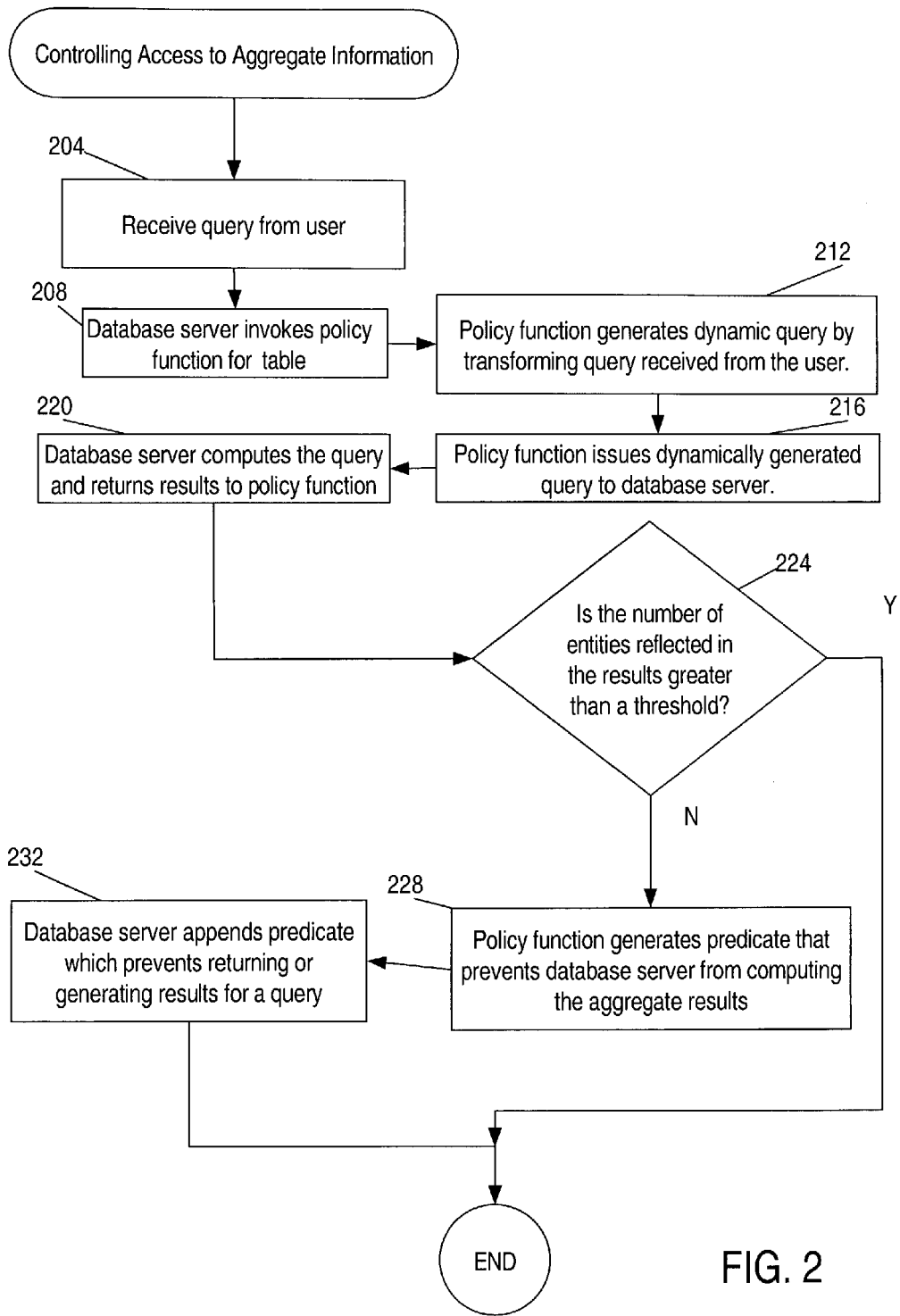
FIG. 2 is a flow chart depicting a process for controlling access to aggregate information that may implemented using a fine grain access control mechanism according to an embodiment of the present invention.

FIG. 2 is a flow chart depicting a process for controlling access to aggregate information that may be implemented using a fine grain access control mechanism according to an embodiment of the present invention. The process is illustrated using the following query QA, which conforms to SQL ("Structure Query Language").

select sum(revenue) from patients where name fname='SCOTT'

Referring to 2, at step 204, the database server 100 receives query QA from user 110. At step 208, database server 100 invokes a policy function 152 for the patient table 102 being accessed by the query, which in the current example is query QA.

At step 216, the policy function issues the dynamically generated query to the database server 100. At step 220, database server 100 computes the transformed query generated at step 212 and returns the results to the policy function. In the current example, the result returned is 10 because 10 is the number unique patients that have the first name of 'SCOTT'.

The column patient ID contains values that uniquely identify a patient. PatientID may be, for example, a primary key that is unique among all rows in patient table 104, and thus the unique( ) function would not be required.

At step 216, the policy function issues the dynamically generated query to the database server 220. At step 220, database server 100 computes the transformed query generated at step 212 and returns the results to the policy function. In the current example, the result returned is 10 because 10 is the number unique patients that have the first name of 'SCOTT'.

At step 224, the policy function determines whether the base cardinality of the aggregate information requested by the aggregate query satisfies a threshold, that is, whether the number of entities about which information is stored in the rows of the table satisfies the threshold. If so, execution of the steps ceases. Otherwise, execution proceeds to step 228.

At step 228, the policy function generates a predicate to append to the received query that prevents results from being returned for the aggregate query. An example of such a predicate is one based on a condition that cannot possibly be true e.g. 1=2.

At step 232, the database server appends the predicate to the aggregate query. Execution of the steps ends.

As mentioned before, a table with rows that contain confidential information about entities may have multiple rows that correspond to one entity. Lab results table 104 is an example of such a table. Aggregate information derived from numerous rows in the lab results table 104 may correspond to just one patient, and thus have a base cardinality of one with respect to patients. The unique function and a foreign key column that holds patientId values in the lab results table 104 may be used to accurately compute the base cardinality.

To illustrate, the following query QL is provided:
select sum(charges) from "lab results" where patient_street="my way"

The query dynamically generated at step 216 is QL', which is shown below.
select count(unique(patientId)) from "lab results" where patient_street="my way"

Alternate Embodiments

In another embodiment of the present invention, a query is generated and issued at step 212 and 216 only if the query in issue requires access to particular columns. Furthermore, the policy functions may be executed for other types of operations other than query operations, such as insert, delete, and update. For example, a policy function could be implemented to ensure that a query operation requested in a database statement updates rows for a threshold number of entities, or updates all entities.

The techniques for access control described herein are not limited to governing access based on base cardinality. The present invention may be used to govern access based on any kind of the results that can be computed from queries that can be dynamically generated in the same manner query QA is computed. The dynamically generated query may be generated by a database server using other mechanisms other than a policy function of a fine grain access control mechanism.

The techniques for access control described herein have many advantages that stem, at least in part, from the fact that access can be controlled from within the database server using a policy function. Controlling access in this way avoids reliance on the use of components and applications outside the database server to implement access control. Access control can be imposed upon users that even have direct access to a database server. Furthermore, selection of database tools and utilities (e.g. form builders like Oracle™ Forms or Microsoft™ Access) to use with a database server need not be limited to those that provide and or can be configured to provide the needed access control. Furthermore, changes in access control policies can be implemented quickly by modifying the policy functions rather than modify numerous outside components and applications, which may require far greater effort to modify.

Hardware Overview

Figure 3:
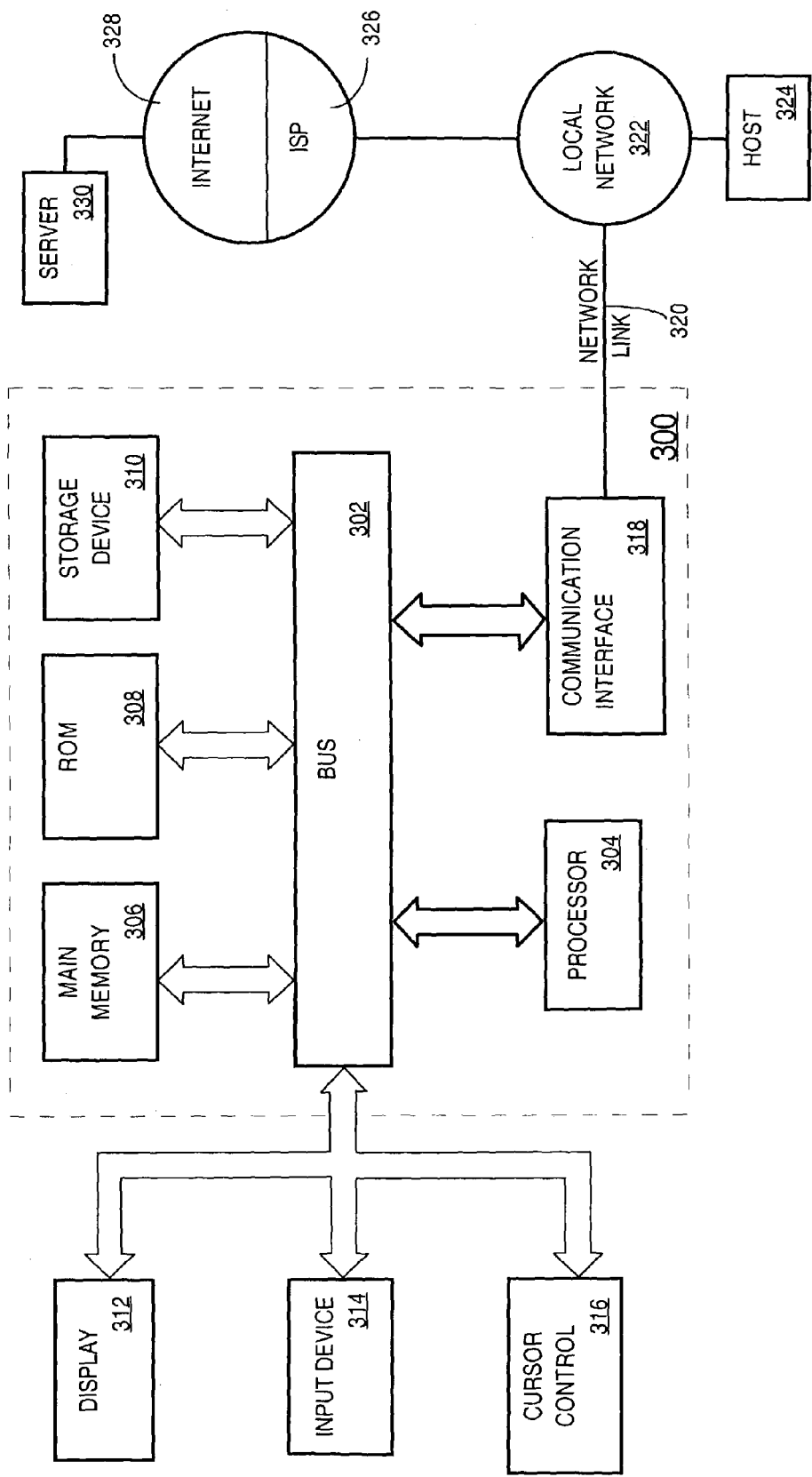
FIG. 3 is a flow chart depicting a computer system which may be used to implement an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for controlling access to aggregated data, the method comprising the steps of:
　a database server receiving from a user a first query that requests first aggregated data, wherein said first query includes an aggregation function that aggregates information about a set of entities;
　transparently to said user, said database server determining whether a base cardinality of said first aggregated data satisfies a cardinality threshold number of entities, wherein determining whether said base cardinality of said first aggregated data satisfies said cardinality threshold number of entities includes:
　　generating a second query that requests results that indicate a count of how many entities are in said set of entities;
　　causing computation of said results requested by said second query; and based on said results requested by said second query, determining that said count of how many entities are in said set of entities is less than the cardinality threshold number of entities;

in response to said database server determining that said base cardinality of said first aggregated data fails to satisfy the cardinality threshold number of entities, modifying said first query to prevent returning said first aggregated data as requested by the first query; and wherein the method is performed by one or more computing devices.

2. The method of claim 1, wherein the step of generating said second query includes transforming said first query to generate said second query.

3. The method of claim 1, wherein modifying the first query includes calling a user-supplied routine through an Application Programming Interface (API) that allows said user-supplied routine to return a predicate to incorporate into said first query.

4. The method of claim 1, wherein said aggregation function is applied to one or more attributes of a body of data.

5. The method of claim 1, wherein:
said set of entities are human individuals; and
said information about said set of entities includes confidential information about said human individuals.

6. The method of claim 1, wherein:
said first query requests data from records that contain information about said set of entities; and
at least one record of said records corresponds to a plurality of entities from said set of entities.

7. The method of claim 1,
wherein said first query requests information from one or more columns of a table; and
wherein said one or more criteria include a criterion based on the one or more columns from which said first query requests information.

8. A computer-readable volatile or non-volatile medium storing one or more sequences of instructions which, when executed by one or more processors, cause the one or more processors to perform:

receiving from a user, at a database server, a first query that requests first aggregate data, wherein said first query includes an aggregation function that aggregates information about a set of entities;

transparently to said user, at said database server, determining whether a base cardinality of said first aggregated data satisfies a cardinality threshold number of entities, wherein determining whether said base cardinality of said first aggregated data satisfies said cardinality threshold number of entities includes:

generating a second query that requests results that indicate a count of how many entities are in said set of entities;

causing computation of said results requested by said second query; and based on said results requested by said second query, determining that said count of how many entities are in said set of entities is less than the cardinality threshold number of entities;

in response said database server determining that said base cardinality of said first aggregated data fails to satisfy the cardinality threshold number of entities, modifying said first query to prevent returning said first aggregated data as requested by the first query.

9. The computer-readable volatile or non-volatile medium of claim 8, wherein the instructions causing generating said second query further comprise instructions, which, when executed by the one or more processors, cause the one or more processors to perform transforming said first query to generate said second query.

10. The computer-readable volatile or non-volatile medium of claim 8, wherein the instructions causing generating said second query further comprise instructions, which, when executed by the one or more processors, cause the one or more processors to perform calling a user-supplied routing through an Application Programming Interface (API) that allows said user-supplied routine to return a predicate to incorporate into said first query.

11. The computer-readable volatile or non-volatile medium of claim 8, wherein said aggregation function is applied to one or more attributes of a body of data.

12. The computer-readable volatile or non-volatile medium of claim 8, wherein:
said set of entities are human individuals; and
said information about said set of entities includes confidential information about said human individuals.

13. The computer-readable volatile or non-volatile medium of claim 8, wherein:
said first query requests data from records that contain information about said set of entities; and
at least one record of said records corresponds to a plurality of entities from said set of entities.

14. The computer-readable volatile or non-volatile medium of claim 8, wherein said first query requests information from one or more columns of a table; and
wherein said one or more criteria include a criterion based on the one or more columns from which said first query requests information.

* * * * *

UNITED STATES PATENT AND TRADEMARK OFFICE
CERTIFICATE OF CORRECTION

PATENT NO. : 7,873,660 B1
APPLICATION NO. : 10/377366
DATED : January 18, 2011
INVENTOR(S) : Daniel Manhung Wong et al.

Page 1 of 1

It is certified that error appears in the above-identified patent and that said Letters Patent is hereby corrected as shown below:

In column 10, line 9, in claim 8, after "entities;" insert -- and --.

In column 10, line 10, in claim 8, after "response" insert -- to --.

Signed and Sealed this
Fourth Day of October, 2011

David J. Kappos
*Director of the United States Patent and Trademark Office*